(12) United States Patent
Wray et al.

(10) Patent No.: US 6,993,651 B2
(45) Date of Patent: Jan. 31, 2006

(54) SECURITY PROTOCOL

(75) Inventors: Michael Wray, Bath (GB); Niels Ferguson, Amsterdam (NL)

(73) Assignee: Hewlett-Packard Development Company, L.P., Houston, TX (US)

( * ) Notice: Subject to any disclaimer, the term of this patent is extended or adjusted under 35 U.S.C. 154(b) by 891 days.

(21) Appl. No.: 09/733,014

(22) Filed: Dec. 7, 2000

(65) Prior Publication Data

US 2001/0005883 A1   Jun. 28, 2001

(30) Foreign Application Priority Data

Dec. 8, 1999 (GB) .................................. 9929032

(51) Int. Cl.
H04I 12/22 (2006.01)
H04L 9/32 (2006.01)

(52) U.S. Cl. ..................... 713/151; 713/153; 713/201

(58) Field of Classification Search ................ 713/151, 713/201

See application file for complete search history.

(56) References Cited

U.S. PATENT DOCUMENTS

| | | | |
|---|---|---|---|
| 4,868,877 A | 9/1989 | Fischer | 713/517 |
| 5,005,200 A | 4/1991 | Fischer | 380/30 |
| 5,218,637 A | 6/1993 | Angebaud et al. | |
| 5,497,422 A | 3/1996 | Tysen et al. | |
| 5,515,441 A | 5/1996 | Faucher | |
| 5,819,044 A | 10/1998 | Kawabe et al. | 395/200.56 |
| 5,825,890 A * | 10/1998 | Elgamal et al. | 713/151 |
| 5,898,784 A | 4/1999 | Kirby et al. | 713/153 |
| 5,907,621 A | 5/1999 | Buchman et al. | |
| 5,923,842 A | 7/1999 | Pedersen et al. | 395/188.01 |
| 5,940,591 A * | 8/1999 | Boyle et al. | 713/201 |
| 5,958,050 A | 9/1999 | Griffin et al. | |

(Continued)

FOREIGN PATENT DOCUMENTS

EP   0 328 232 A2   8/1989

(Continued)

OTHER PUBLICATIONS

Snow, David,A.; Apparatus and Method for Providing Network Security; Feb. 17, 1994, PCT, International Publication No. WO 94/03859.*

(Continued)

Primary Examiner—Ayaz Sheikh
Assistant Examiner—Pramila Parthasarathy

(57) ABSTRACT

A system has a local client application (10) and a communications stack (20, 14) by which the local application can communicate with remote peer applications on other systems. The communications stack includes a transport entity (14) for providing transport services, and a transport-independent, session-level security entity (20) logically positioned above the transport entity and visible to the local application. The security entity has a key-exchange handshake protocol engine (24) for conducting a handshake with a peer security entity (30) associated with a particular remote application (12) with which the local application (10) wishes to communicate, this handshake involving the exchange of key-related data for use in generating session keys. The security entity (20) also has a secure channel engine (25) for enabling messages to be passed between the local application and the target remote application with authentication and/or encryption. During the key-exchange handshake, the handshake protocol engine (24) exchanges attribute justifications, in the form of one or more certificates, with its peer whereby to enable verification by each system that the application (12;10) being contacted has the particular attributes, if any, required by its own application (10;12).

12 Claims, 11 Drawing Sheets

U.S. PATENT DOCUMENTS

| | | | |
|---|---|---|---|
| 6,081,900 A | 6/2000 | Subramaniam et al. | 713/201 |
| 6,094,437 A | 7/2000 | Loehndorf et al. | 370/420 |
| 6,094,485 A * | 7/2000 | Weinstein et al. | 380/30 |
| 6,134,550 A | 10/2000 | Van Oorschot et al. | 707/9 |
| 6,292,839 B1 | 9/2001 | Naudus et al. | 709/238 |
| 6,377,691 B1 * | 4/2002 | Swift et al. | 380/277 |
| 6,574,224 B1 | 6/2003 | Brueckheimer et al. | 370/395.6 |
| 6,591,306 B1 | 7/2003 | Redlich | 709/245 |
| 6,643,701 B1 * | 11/2003 | Aziz et al. | 709/227 |
| 2002/0035635 A1 * | 3/2002 | Holden et al. | |

FOREIGN PATENT DOCUMENTS

| | | |
|---|---|---|
| EP | 0 402 083 A2 | 12/1990 |
| EP | 0 503 765 A2 | 9/1992 |
| EP | 0 586 022 A1 | 9/1994 |
| EP | 0 651 533 A2 | 3/1995 |
| EP | 0 820 176 A2 | 1/1998 |
| EP | 0 989 501 A2 | 3/2000 |
| EP | 0 969 366 A1 | 5/2000 |
| GB | 2 323 757 A | 9/1998 |
| GB | 2323757 A | 9/1998 |
| GB | 2 333 878 A | 8/1999 |
| GB | 2333878 A | 8/1999 |
| JP | 8110869 | 4/1996 |
| JP | 11031129 A | 2/1999 |
| JP | 11184818 A | 7/1999 |
| WO | 95/23468 A1 | 8/1995 |
| WO | 96/02993 A2 | 2/1996 |
| WO | 98/38759 A2 | 9/1998 |
| WO | WO 98/38759 | 9/1998 |
| WO | 00/08818 A1 | 2/2000 |
| WO | WO 00/08818 | 2/2000 |

OTHER PUBLICATIONS

Mark Merkow, "More Than A Language-XML is a Security Tool Too", May 13, 1999, Internet.com e-Commerce Guide, available from http://ecommerce.internet.com/outlook/print/0,,7761-124821,00.html.

Working Draft, Oct. 14, 1999, W3C, editor Joseph Reagle Jr., "XML Signature Requirements", available from http://www.w3.org/TR/xmldsig-requirments.

Bray, Tim, et al., "Extensible Markup Language (XML) 1.0 Specification", Second Edition, W3C, available at http://www.w3.org/TR/REC-xml, Feb. 1998, pp. 1-57.

Dierkes, T., et al., "The TLS Protocol, Version 1.0", IETF RFC2246, Network Working Group, Jan. 1999, pp. 1-67.

Elien, Jean-Emile, "Certificate Discovery Using SPKI/SDSI 2.0 Certificates", Masters Thesis MIT LCS, available at http://theory.lcs.mit.edu/~cis/theses/elien-masters.ps, May 1998, pp. 11-54.

Ellison, C., "SPKI Requirements", IETF RFC 2692, Network Working Group, Sep. 1999, pp. 1-14.

Ellison, C., "Simple Public Key Certificate", IETF draft draft-ietf-spki-cert-structure-05.txt, available at http://www.clark.net/pub/cme/spki.txt, Mar. 13, 1998, pp. 1-35.

Ellison, C., et al., "SPKI Certificate Theory", IETF RFC2693, Network Working Group, Sep. 1999, pp. 1-36.

Ellison, C., et al., "SPKI Examples", <draft-ietf-spki-cert-examples-01.txt>, available at http://www.clark.net/pub/cme/examples.txt, Mar. 10, 1998, pp. 1-13.

Farrell, S., et al., "Limited AttributeCertificate Acquisition Protocol", available at http://search.ietf.org/internet-drafts/draft-ietf-pkix-laap-00.txt, Internet Engineering Task Force, PKIX Working Group, Internet Draft, published Oct. 1999, pp. 1-10.

Harkins, D., et al., "The Internet Key Exchange (IKE)", IETF RFC 2409, Network Working Group, Nov. 1998, pp. 1-34.

Hewlett-Packard Company, "e-Speak Architecture Specification", Version Beta 2.0, available at http://www.e-speak.hp.com/, Sep. 1999, pp. i-xvi, 1-200.

Kent, S., et al., "Security Architecture for the Internet Protocol", IEFT RFC 2401, Network Working Group, Nov. 1998, pp. 1-66.

Merkow, Mark, "More Than A Language—XML Is A Security Tool Too!", Internet.com e-Commerce Guide, available at http://ecomerce.internet.com/outlook/print/0,,7761_124821, 00.html, May 13, 1999 pp. 1-4.

National Institute of Standards and Technology, *Data Encryption Standard (DES)*, Draft Fips Pub 46-3, U.S. Department of Commerce, available at http://www.ncsl.nist.gov/fips/, Jan. 20, 1999, pp. 1-20.

National Institute of Standards and Technology, *Des Modes of Operation*, Fips Pub 81, available at http://www.itl.nist.gov/fipspubs/.], Dec. 2, 1980, pp. 1-22.

National Institute of Standards and Technology, *Secure Hash Standard*, Fips Pub 180-1, available at http://www.itl.nist.gov/fipspubs/, Apr. 17, 1995, pp. 1-16.

Reagle, Jr., Joseph, editor, W3C Working Draft, "XML Signature Requirements", IETF, available at http://www.w3.org/TR/xmldsig-requirements, Oct. 14, 1999, pp. 1-6.

Rivest, R., "S-Expressions draft-rivest-sexp-00.txt", Network Working Group, available at http://theory.lcs.mit.edu/~rivest/sexp.txt, May 4, 1997, pp. 1-1.

* cited by examiner

US 6,993,651 B2

SECURITY PROTOCOL

FIELD OF THE INVENTION

The present invention relates to a security entity for implementing a session-level security protocol.

BACKGROUND OF THE INVENTION

Security in distributed applications, particularly e-services, is considered by many to be essential for supporting commercial use of the web (World Wide Web). It is obvious that sharing important data such as credit card numbers needs to be done in a secure environment. Many web services use the SSL protocol (Secure Socket Layer) for this purpose. The SSL protocol is described in U.S. Pat. Nos. 5,657,390 and 5,825,890, and has recently been standardised by the IETF (Internet Engineering Task Force) as TLS (Transport Layer Security)—see Reference [1] in the list of references provided immediately prior to the Appendix at the end of this description.

TLS supports both client and server authentication and includes a key exchange so that a secure communication channel providing message encryption and integrity checking can be set up. TLS is directly linked to the TCP/IP as a transport. The receiver of a TLS message determines which TLS session it is for from the socket it receives it on. Since a single TLS session corresponds to one authenticated entity at each end, the overall result is to require a separate TLS session and TCP/IP connection for each pair of communicating entities.

The client and server authentication is normally based on X.509 certificates and therefore identity driven. TLS does not support the mutual verification of attributes represented as tags in SPKI certificates (see References[2] and [3]).

IPSEC is another known security protocol (see Reference [4]). IPSEC deals with network link-level security and therefore exists much lower down the network stack than SSL and addresses different problems. IPSEC uses Internet Key Exchange (IKE—see reference [11]) for authenticated exchange of keying material between systems wishing to set up an IPSEC session. As with TLS, this authentication is based on X.509 certificates. Each IPSEC session is applies to packets meeting criteria specified in selectors; in terms of upwards specificity in the communication stack, the most such selectors can do is specify a particular socket, in other words, IPSEC sessions cannot be directly tied to an application (though by setting up an application to have exclusive use of a particular socket it would, with some inconvenience, be possible to achieve such a result).

It is an object of the present invention to provide a more versatile security protocol layer for communication between remote applications.

SUMMARY OF THE INVENTION

According to the present invention, there is provided a system with a local application entity and communications means by which the local application entity can communicate with peer remote application entities on other systems, the communication means including a transport entity for providing transport services, and a transport-independent, session-level security entity logically positioned above the transport entity and visible to the local application entity, the security entity being operative to set up secure communication sessions with peer security entities in other systems and comprising:

key-exchange handshake means for conducting a handshake with a said peer security entity associated with a particular remote application entity with which said local application entity wishes to communicate, this handshake involving the exchange of key-related data for use in generating session keys; and secure channel means for enabling messages to be passed between the local application entity and said particular remote application entity with authentication and/or encryption of these messages being effected using the session keys generated from said key-related data whereby to secure these messages in passage between the cooperating security entities;

the handshake means being operative when conducting said handshake to exchange attribute justifications, in the form of one or more certificates, with said peer security entity to enable verification by each system that the application entity being contacted has the particular attributes, if any, required by its own application entity.

Preferably, the security entity is capable of establishing multiple concurrent security sessions over a common transport connection set up by the transport entity with another system. This allows multiple local application entities to communicate with multiple peer entities on the other system through one connection; it is also particularly useful in the case where a local application entity is a mediation entity providing mediation services to multiple other application entities (not themselves necessarily local). In this latter situation, the attribute requirement that the mediation entity specifies to the remote application entity being contacted will generally be the attribute requirement of the application entity for which the mediation entity is providing services (although the mediation entity may be able to add its own requirements).

BRIEF DESCRIPTION OF THE DRAWINGS

A session level security protocol and entity embodying the invention will now be described, by way of non-limiting example, with reference to the accompanying diagrammatic drawings, in which.

BEST MODE FOR CARRYING OUT THE INVENTION

Figure 1:
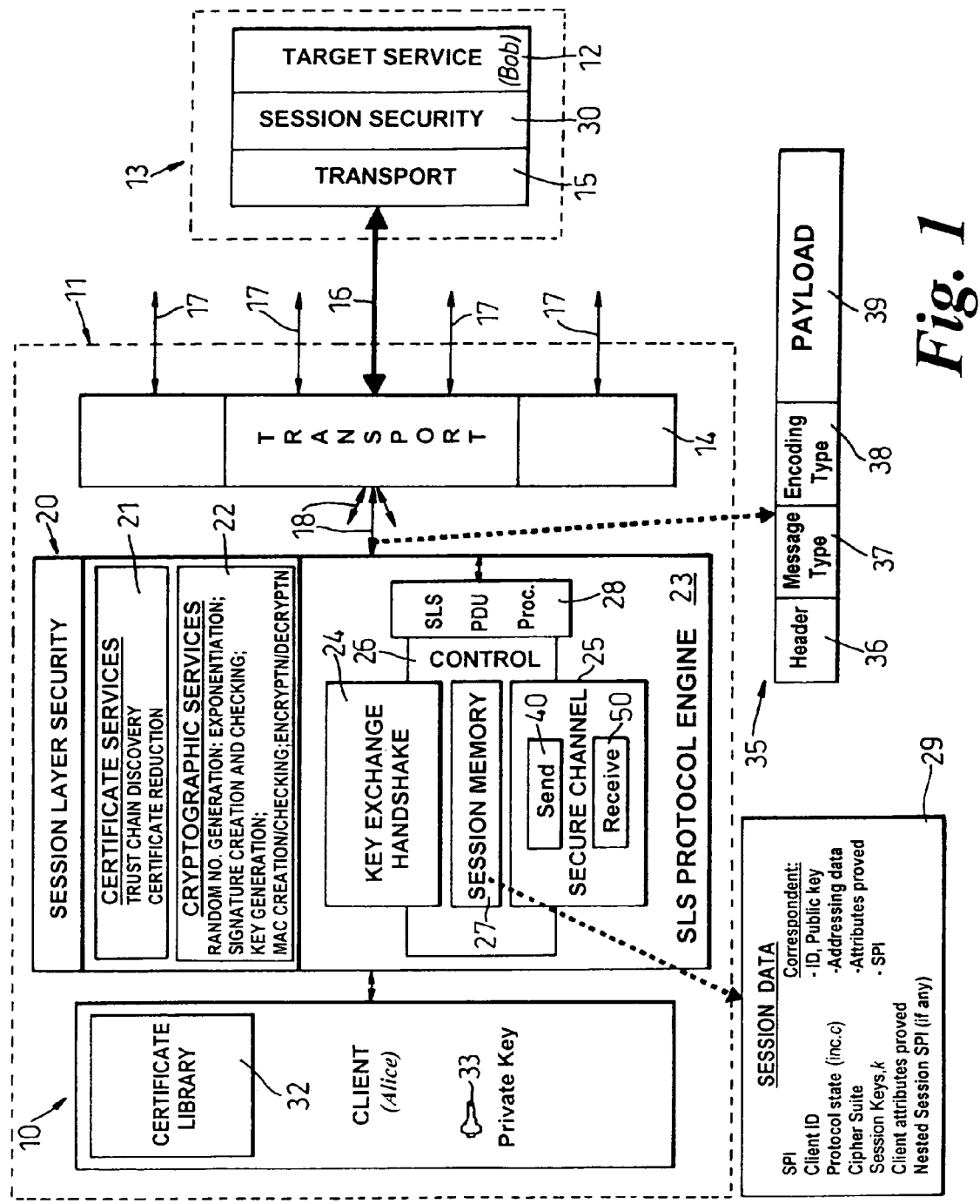
FIG. 1 is a diagram of an end-to-end communication arrangement showing details of an embodiment of a Session layer Security (SLS) protocol entity used to establish a secure session over the communication arrangement.

FIG. 1 depicts an end-to-end secure communication path between a client 10 of a first end system 11 and a target service 12 of a second end-system 13 which client 10 wishes to use. This communication path involves a reliable connection 16 established between the end systems 11, 13 by transport entities 14, 15 of the two systems. The precise details of the transport mechanism used to establish and maintain connection 16 is not of importance to the present invention; however, by way of example, the connection 16 can be a TCP/IP connection. Typically, the transport entities 14, 15 are arranged to handle multiple simultaneous connections potentially of different types, and this is represented by arrows 17 in FIG. 1. Each connection, such as connection 16, may carry traffic for multiple simultaneous sessions of one or more applications (the client 10 being one such application) as is indicated by arrows 18. In the following The following description, which is primarily concerned with how security is provided during communication between two applications (client 10 and service 11), will focus on the provision of security for a single secure session between the client 10 and service 12 over the connection 16.

Security for communication between client 10 and service 11 is provided at the level of a session by cooperating session-level security ('SLS') entities 20, 30 in end systems 11, 13 respectively, the SLS entity 20 being logically located between the client 10 and transport entity 14 and the SLS entity 30 being logically located between service 12 and transport entity 15. Each SLS entity is capable of handling multiple simultaneous sessions involving different client-service pairings. The protocol operated between the SLS entities is herein referred to as the SLS protocol.

When the client 10 wishes to establish a communication session with service, the SLS entities first carry out a handshake procedure the purpose of which is two-fold:
  to determine if each party has certain 'attributes' required of it by the other—if this is not the case, then a communication session is not established
  to exchange cryptographic data to enable shared keys to be established for the communication session being established (if allowed).

Assuming the handshake was successful, the SLS entities are then responsible for operating the resultant secure channel established between the client 10 and service 11.

An 'attribute' expresses some property such as a name, a location, a credit limit, an owner or a role. Attributes are proved by certificates that are exchanged and authenticated to ensure that neither party (client or service) is making false claims about the possession of an attribute. Whilst the identity of the client or service constitutes an attribute, there is no a priori requirement that this attribute must be presented and verified—it is up to the parties (client 10, service10) to specify what attributes they require of the other.

In the present arrangement, attributes are established by SPKI certificates which are explained in detail in references [2] and [3]. It should be noted that as used herein, the term 'attribute certificate' means any signed electronic instrument bestowing an attribute on the subject of the certificate and therefore encompasses both SPKI 'attribute' certificates and SPKI 'authorization' certificates.

Proving that a party has a particular attribute means establishing a trust chain of valid certificates back to a party inherently trusted in relation to matters concerning the attribute. This trust chain may involve not only attribute certificates but also 'name' certificates. In this respect, it is useful to note that the issuer and subject of an SPKI certificate is fundamentally a principal constituted by a public key (or it's hash). Of course, there will be a keyholder associated with the public key (this being the party holding the private key matching the public key) but that party may not be identified at all. The subject of certificate may also be specified by a name but in this case there should also be a name certificate mapping the name to the corresponding principal.

A more detailed discussion of SPKI certificates and their use in proving attributes can be found in our co-pending UK patent application filed on the same date as the present application and entitled "Method and Apparatus for Discovering a Trust Chain Imparting a Required Attribute to a Subject" to which reference is directed.

In order to provide the means for implementing the foregoing features, the SLS entity 20 (and correspondingly the entity 30) comprises:
  a certificate services block 21 for providing trust chain discovery and certificate reduction services;
  a cryptographic services block 22 for providing signature creation and checking services and exponentiation services during the key-exchange handshake, key generation services for generating the session keys for the secure channel established following a successful handshake, and MAC (Message Authentication Code) creation/checking services and encryption/decryption services for message exchanged over the secure channel; and
  a protocol engine 23 with a key exchange handshake functional block 24, a secure channel functional block 25, a SLS PDU processing block 28, and a control block 26.

The control block 26 is responsible for coordinating the other elements of the protocol engine 23 according to input received from the client 10 and present in the unencrypted header fields of messages received over connection 16 via the transport entity 14. As already mentioned, the SLS entity is capable of handling multiple simultaneous sessions and the control block 26 is responsible for correctly associating client input and messages with the appropriate secure communication session (or to initiate a new session if no session currently exists when client 10 requests to communicate with services 12); this it does by assigning an identifier to each secure session, this identifier being herein called the Security Parameters Identifier (SPI) following the terminology used in the IPSec documents (see reference [4]). The SPI is carried in clear by messages passed over the secure channel. The control block 26 stores information relevant to each session, including the related SPI, in a session memory 27 and whenever the protocol engine receives a message from transport entity 14, it uses the SPI to look up the appropriate session data. The session data can also be accessed by client id. Block 29 in FIG. 1 indicates the most important data items held for each session, the role of each item being explained hereinafter when describing the key-exchange handshake and the processing of messages for the secure channel.

The client 10 holds its own private key 33 used for digitally signing messages during the key exchange to authenticate them as originating from itself. The signing functionality is provided by the cryptographic services block 22. The client also holds its own collection of SPKI certificates in certificate library 32 from which it can extract the certificates appropriate for proving that it has particular attributes. Whilst the client endeavors to keep a record of the chain of certificates appropriate for proving each of its attributes, it can call on the trust chain discovery functionality provided by the certificate services block 21 to help it find such a chain (a suitable form of trust-chain discovery engine is described in our above-mentioned co-pending patent application). The client 10 can also call on the certificate services block to prove that a set of certificates provided by the service 12 actually prove that the latter has required attributes (proving this may require not only the certificate reduction functionality of block 21, but also the trust chain discovery functionality if the certificates are presented out of order); the signature verification service of the cryptographic services block 22 will also be needed to verify that the certificates presented check out.

SLS is a layered protocol with a base layer implemented by the SLS PDU processor 28, the latter serving to assemble/disassemble SLS PDUs (protocol data units) by adding/removing a heading to/from a payload formed the output of the higher SLS protocol layer (for example the key-exchange protocol operated by the handshake protocol engine 24 or the secure channel protocol operated by the secure channel protocol engine 25). The general form of the SLS PDUs is depicted in FIG. 1 for a PDU 35. The PDU 35 has, in addition to a payload 39, a heading made up of three fields as follows:

- a header field 36 containing the receiving party's SPI for the current session, to and from addresses (in any form suitable for transport entity 14), and a message serial number c described below;
- a message type field 37 indicating one of the following four message types:
  HANDSHAKE
  APPLICATION (payload to be passed to application)
  TUNNEL (messages for nested sessions)
  ALERT (error messages)
- an encoding type field 38 indicates the security processing in force as determined by the current cipher suite (see below), namely, clear text, a message protected by a MAC or an encrypted message (also with a MAC)

The key exchange handshake protocol effected by the handshake protocol engine 24 to set up a secure channel will next be described in detail, the approach taken being to build up the protocol element by element. In keeping with cryptographic tradition, the participants in the protocol are called 'Alice' and 'Bob' with Alice initiating the protocol exchange. Alice and Bob respectively correspond to the client and service sides of the FIG. 1 arrangement—it should, however, be noted that Alice encompasses both the client 10 and SLS entity 20 and Bob encompasses both the service 12 and the SLS entity 30 though it will be apparent from what has been written above, where any particular processing takes place.

KEY EXCHANGE PROTOCOL

As will be seen, the key exchange protocol used in the present SLS implementation provides the following features:
1. Each party can present a set of attributes to the other party.
2. Each party is convinced that the other party has the claimed attributes if the protocol completes.
3. The protocol results in a shared secret key that can be used for establishing a secure channel. Only the two participants in the protocol have access to this key. The key is tied to the attributes that have been demonstrated by both parties.
4. The attribute-proving system is only required to be signature-capable. That is, it is assumed that the attribute certification scheme ties attributes to the possession of a signature-capable private key. The protocol uses only the signature attribute of this key.
5. If the private signature keys used in this protocol are compromised after the protocol has for use in the secure channel is not compromised.

Basic Diffie-Hellman Key Exchange Protocol.

Figure 2:
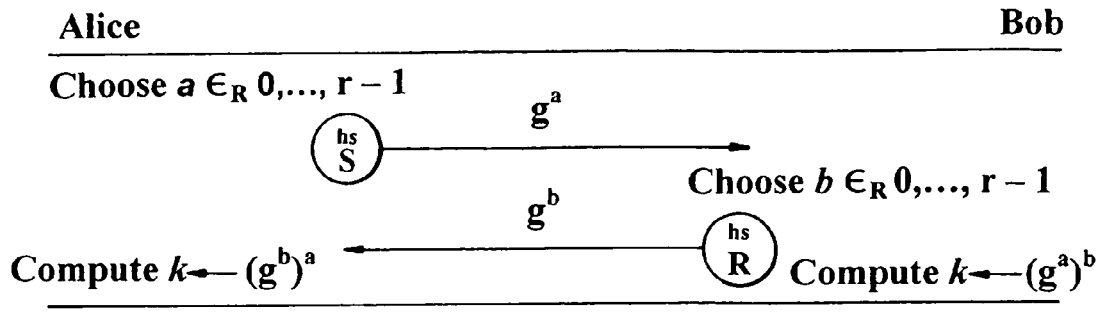
FIG. 2 is a diagram depicting the basic Diffie-Hellman key exchange protocol.

The protocol is based on the well known Diffie-Hellman key exchange protocol shown in FIG. 2. Alice chooses a random number a, computes $g^a$ and sends it to Bob in a handshake_Start message hsS; Bob chooses his own random number b, computes $g^b$ and sends this value to Alice in a handshake_Reply message hsR. The computations are done in a group G, here called the Diffie-Hellman group or DH-group for short. The element g is a generator of G. Both a and b are random numbers in the range 0, . . . , r−1 where r is the order of the group G. The operator $\epsilon_R$ denotes the choosing a random element in a range.

The reader does not need to understand the mathematical concepts' of a group, its generator or its order. It is sufficient to know that a group is a structure which defines a multiplication. Exponentiation is defined by repeated multiplication, as it is done in the case of integers. Implementers will need to understand the group structure in order to implement the necessary multiplication. The actual group that is used can be varied; this is a choice that has its own tradeoffs between message size, efficiency, security, and simplicity of code. Suitable groups can readily be specified by competent cryptographers.

The DH protocol is based on the fact that Alice can compute $g^{ab}$ given a and $g^b$, and that Bob can compute the same value $g^{ab}$ given b and $g^a$. However, an attacker that has access to the communicated messages knows only $g^a$ and $g^b$. In a suitable DH-group it is computationally infeasible to compute $g^{ab}$ given only $g^a$ and $g^b$. The end result is therefore that both Alice and Bob have the same number k, but an eavesdropper cannot know k.

The secret key k can now be used to establish a secure link to exchange further messages. These messages can be authenticated and encrypted using k. This provides confidentiality of the message contents and proves to the receiver of the message that it originated from the sender.

DH With Signatures

Figure 3:
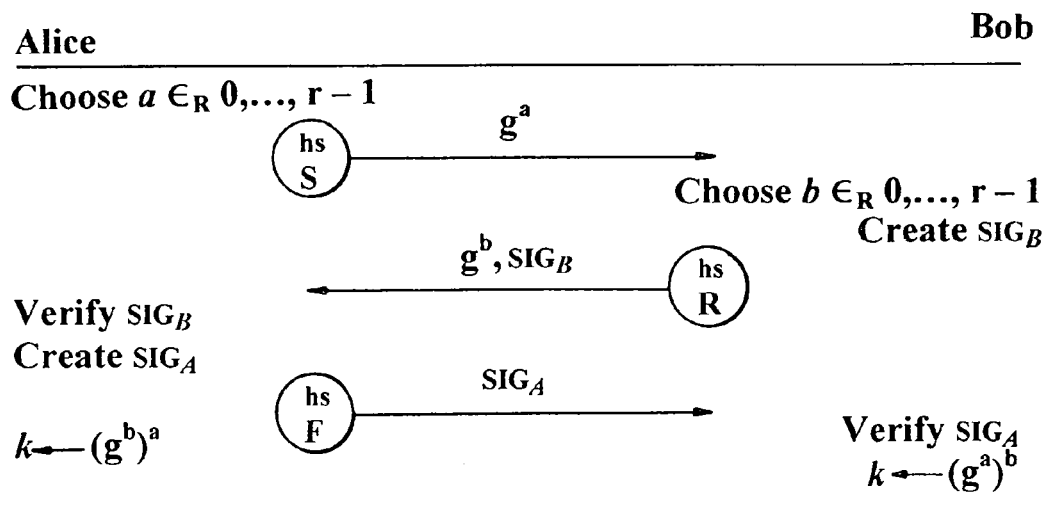
FIG. 3 is a diagram showing the addition of signatures to the FIG. 2 protocol.

The basic DH protocol has a weakness in that Alice and Bob only know that they are talking to someone, but not whether they are talking to each other. To resolve this problem two digital signatures are introduced into the protocol (see FIG. 3) which require a private key to create and a public key to verify. The data that is signed in each signature consists of all the message data that was exchanged in the protocol before the signature. Thus $SIG_B$ signs $g^a$ and $g^b$ in handshake_Reply message hsR, and $SIG_A$ signs $g^a$, $g^b$ and $SIG_B$ in a new message, handshake_Finish hsF. This signing of all previously-exchanged data is maintained for the protocol extensions discussed below where further data is added to the various messages (though, for clarity, not all data elements are necessarily shown in every depiction). As will be discussed below, the digital signatures are used in the handshake protocol as part of a process to establish that each party is the keyholder of the private key corresponding to the public key by which the signature can be verified; the identity of the keyholder, other than in terms of their public key, may or may not be thereafter verified by reference to a certificate.

From Alice's point of view the key exchange protocol so far establish looks as follows. She sends out $g^a$ and receives $g^b$ and $SIG_B$ back. (The third message does not provide any new knowledge to Alice.) This allows her to draw several conclusions:

1. Somebody knows the secret key necessary to create $SIG_B$. Alice sent a random value $g^a$ and received a signature back that included this value. This signature must therefore have been created after Alice chose a, which implies that somebody (which we call 'Bob') has access to that private key.
2. The pair ($g^a$ $g^b$) was approved by Bob. In this protocol the interpretation is along the lines of: "I received $g^a$ and chose $g^b$ as my reply in the DH protocol that we are executing."
3. The value k is only known to Alice and Bob.

Bob can derive much the same conclusions as Alice can. Alice (i.e. the party that knows the private key needed to create signatures) has approved the pair ($g^a g^b$), and k is only known to Bob and Alice.

DH Group Flexibility.

As mentioned there are many possible DH groups that can be used. As time progresses and computers get faster it will become necessary to use larger and larger groups (or a different type of group) to maintain the same security level. It is therefore not possible to fix the group to be used. Furthermore, as mentioned, the choice of group has its own tradeoffs and different installations might choose differently.

Figure 4:
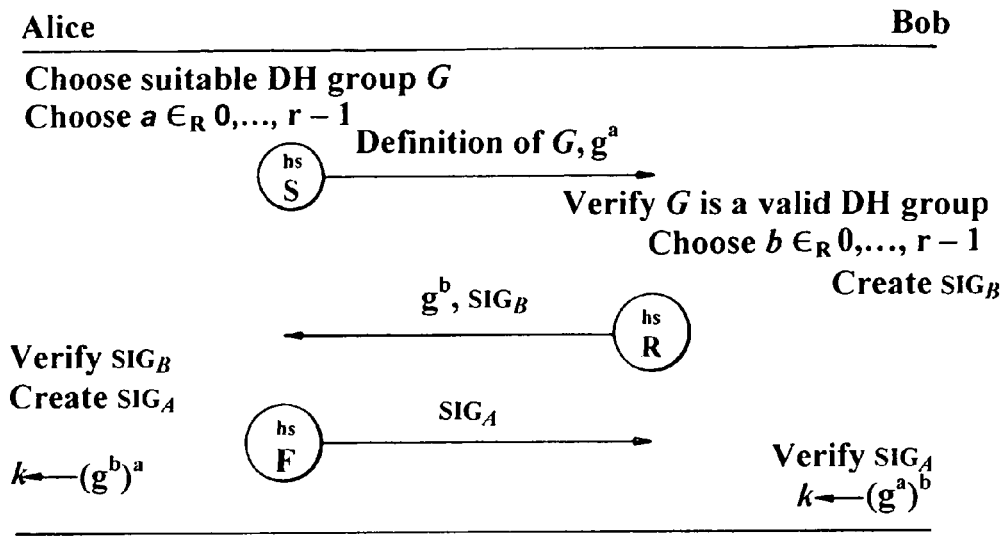
FIG. 4 is a diagram showing the addition of DH group flexibility to the FIG. 3 protocol.

FIG. 4 shows how the protocol is extended to accommodate varying DH groups. Alice starts out by choosing a suitable DH group G. For most implementations only a single group will be used, and Alice will use whatever group was configured (generating a DH group usually takes a fair amount of time, so Alice should not do this on-line.) Alice sends the definition of the DH group to Bob in the first message hsS. The definition of G includes the type of group and the choice of the generator g.

When Bob receives the group definition he has to perform some checks to ensure this is a valid and properly chosen DH group. This is necessary as there are many valid group definitions that are cryptographically weak. If Bob does not check the group then he cannot later trust the secure channel that this protocol sets up.

Note that the group definition is included in both signatures. This ensures that both parties are using the same group and that an attacker cannot manipulate the parties into using different groups in a single protocol execution.

Checking the validity of a group typically involves at least an order of magnitude more work than the rest of the protocol. To avoid having to perform the checks every time, Bob preferably keep a cache of 'approved' groups that have passed the checks.

Adding Certificates.

As already indicated, in the SLS protocol, a major purpose of the key exchange protocol is to verify attributes. That is, Alice wants to verify that Bob has certain attributes and Bob wants to verify that Alice has certain attributes. These attributes can express an identity ('I am Bob'), a property ('I work for HP labs in Bristol'), or an authorisation ('I am allowed to use the printers on floor 2').

The key exchange process has a fairly simple interface to the attribute system. For party to prove that it has a attribute two things are needed: a attribute justification linking the attribute with a public key (allegedly that of the party concerned), and a proof that the party possesses the related private key. The attribute justification will typically consist of a set of certificates from the certificate library 32 of one party and verified by the attribute justification system of the other party. A justification implies a statement of the form: 'The holder of the private key corresponding to the public key X has attributes $c_1, c_2, \ldots$'.

Figure 5:
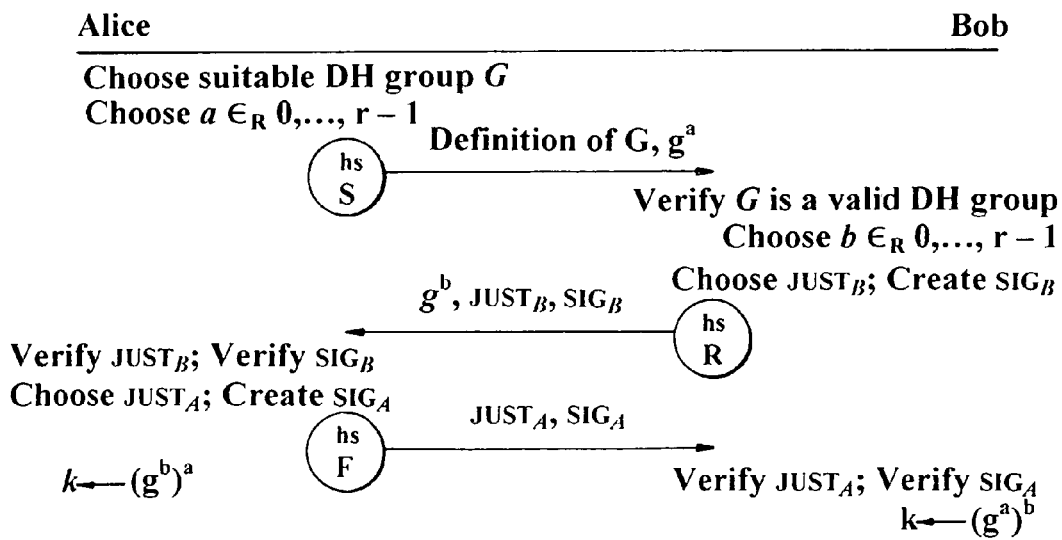
FIG. 5 is a diagram showing the addition of justifications to the FIG. 4 protocol.

The extension of the protocol as so far described to accommodate Bob and Alice proving to the other that they possess certain attributes involves each of them sending their own attribute justification JUST, and using their corresponding private key to create the signature already in the protocol (note that Alice or Bob may well have more than one associated public/private key pair with certain attributes being associated with one public key and other attributes with a different public key—obviously, the correct private key must be used for the attribute requiring to be proved). The exchange of attribute justifications is shown in FIG. 5: Bob's attribute justification $JUST_B$ is included in message hsR whilst Alice's attribute justification $JUST_A$ is included in message hsF. Bob's signature is done with the key that proves possession of the attributes that are the subject of attribute justification $JUST_B$. Similarly, Alice's signature is done with the key that proves possession of the attributes according to $JUST_A$.

As previously indicated, the protocol does not necessarily identify the two parties other than by their public keys.

Attributes that Depend on Multiple Keys.

There may be some situations in which it is simpler for the attribute system to use several private keys. In that case the justification corresponds to a statement of the form: 'The holder of the private keys corresponding to the public keys $X_1, X_2 \ldots$ has attributes $c_1, C_2, \ldots$'.

The protocol can support this—instead of sending a single signature, the party that uses such a multi-key justification sends a separate signature with each of the private keys. For example, if Bob uses such a justification, $SIG_B$ would consist of a list of signatures, one for each of the keys required by the justification. For simplicity, all these signatures sign the same data string which consists of all the data exchanged before the signatures. (Thus, the last signature does not include the earlier signatures of the same list in its signature data.) For simplicity, this generalization is ignored for the remainder of this discussion of the key exchange protocol as to include it makes the overall description more complex without adding any significant under-standing. If required, multi-key justifications and signatures can be used in the SLS protocol.

Secure Channel Identifiers

As already mentioned, individual sessions are identified by an SPI. The SPI assigned by Alice to the session with Alice will generally be different ot that assigned by Bob to the same session but this does not matter. By having Alice and Bob exchange the SPI's they have assigned to the session, each can attach to any message it sends the other the SPI assigned by the latter. The advantage of letting each party choose their own SPI is that some or all of the bits of the SPI can be used directly as an index into a table. This speeds up processing on the receiving side.

Figure 6:
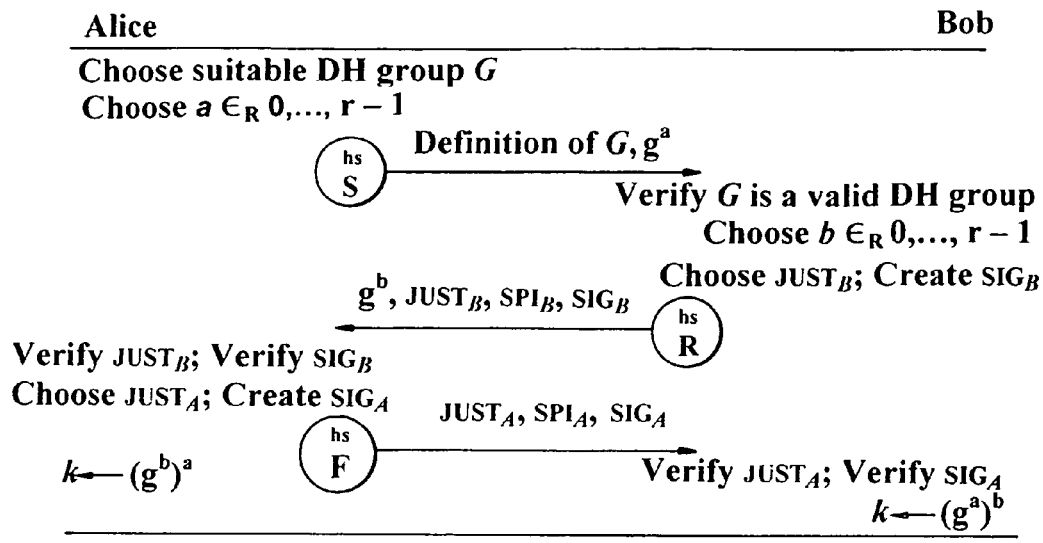
FIG. 6 is a diagram showing the addition of SPI exchange to the FIG. 5 protocol.

FIG. 6 shows how the $SPI_A$ and $SPI_B$ fields are added to the messages, $SPI_B$ being included in message hsR and $SPI_A$ being included in message hsF. These fields are automatically included in the signatures. At the end of the protocol Alice and Bob store the SPI values with the other information of the secure channel for identification purposes.

Attribute Selection Advice.

During the protocol, Alice and Bob have to provide a set of attributes. This poses the question how they know which attributes to include. It is certainly inadvisable to include every attribute they possess. A system administrator might easily have thousands of attributes. To deal with this problem, a system of attribute advisories is used to help the participants select the appropriate attributes.

The attribute advisory system is asymmetric; that is, the features it provides to Alice and to Bob are slightly different. There are two reasons for this asymmetry. First of all, the 3-message protocol is inherently asymmetrical and adding advisories results in an asymmetric advisory system. The advisory system could be made symmetrical by reducing the functionality for one side, or by adding two messages to the protocol. Adding messages is too expensive (in terms of additional delay, and complexity). Restricting the functionality would force the system to discover the information in a different manner, probably using at least two additional messages.

The second reason is that the requirements are actually different for the two parties. In this protocol Alice is the initiator. She is the one who wants to send a message to Bob and set up a secure channel for it. Presumably Alice knows what she intends to do, and which attributes she would like Bob to show. Bob, on the other hand, has no idea what Alice wants. Therefore, it can be impossible for Bob to give any good advise on what attributes he will require of Alice without some information about what Alice intends to do. The existing 3-message structure allows the parties to exchange exactly that information without adding additional messages.

A typical example would be that the client Alice tries to access the resource Bob. Alice knows what she wants to do with the resource, and which attributes she requires the resource to have. Bob has no idea what functions Alice wants to call on the resource.

Figure 7:
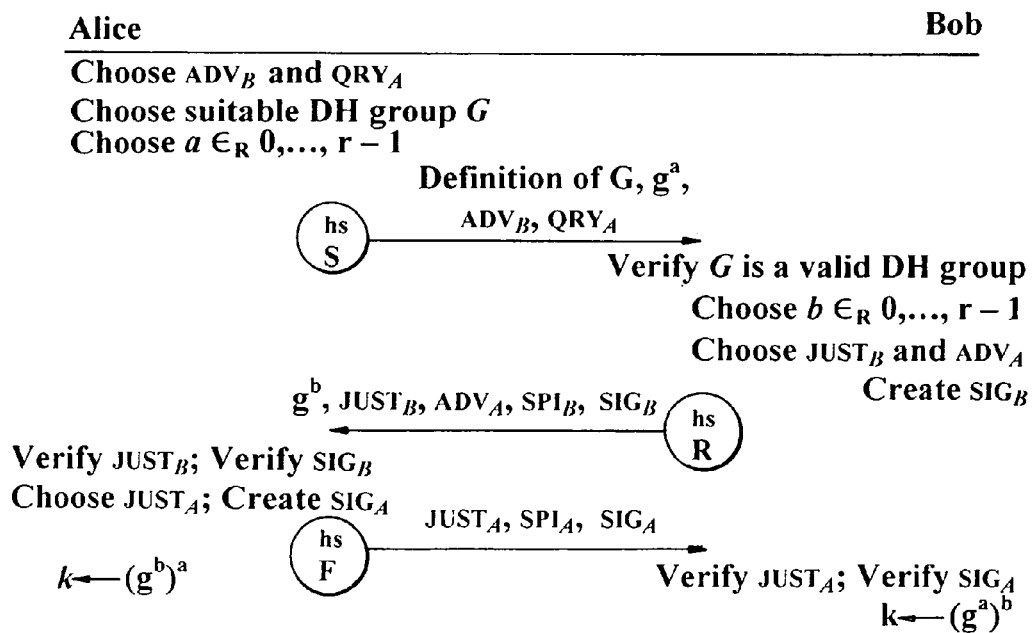
FIG. 7 is a diagram showing the addition of attribute advisories to the FIG. 6 protocol.

The attribute advice system consists of three fields, as shown in FIG. 7. The first field is in the first message hsS, and is called $ADV_B$. This is Alice's advice as to which attributes Bob should include in $JUST_B$. The other two fields are a more complex negotiation to help Alice determine which attributes she should include in $JUST_A$. In the first message hsS, Alice sends $QRY_A$ to Bob. This is a query field which Alice and Bob are arranged to interpret in the same way. $QRY_A$ contains the enough information for Bob to give a sensible $ADV_A$ to Alice. In a client-resource negotiation, the $QRY_A$ could consist of a set of resource operations Alice plans to call in the future. Bob can then inform Alice in $ADV_A$ what attributes are required for this. The $ADV_A$ field is included in the second message hsR.

Under most circumstances parties should satisfy the attributes listed in the advisory, but this is not mandatory—the advisories are just that, advisory. If Alice requests Bob to show attribute X, and he does not, then Alice is likely to refuse to use the resulting secure channel that the protocol establishes. Similarly, Bob is likely to refuse to process messages from the secure channel if Alice has not shown enough attributes during the key exchange protocol. In fact, either Bob or Alice is likely to decide not to complete the setting up of a secure channel if the other cannot show the required attributes.

There are several situations in which a party would want to send more attributes than those that are requested directly. For example, if a client opens a file for reading, but knows she will want to write the file later, then it is more efficient to include enough attributes in the protocol so that the secure channel can also be used to write the file. This clearly indicates that a party should be free to include more attributes than those requested.

It could be argued that it never makes sense to include fewer attributes than those requested. But there is a significant functional difference between the protocol failing with an error, and the recipient of the message sending an error reply which includes error codes and other information. There are also situations in which a party wants to continue even though it does not have enough attributes. For example, Alice might want to access a high-speed network if it is available and not being used for video-conferences. If the high-speed network is not available, she knows she has access to the low speed network.

If Bob is merely fronting for a service Charlie, then when Bob is contacted by Alice he is likely to be unable to satisfy Alice's requirements which Alice would have specified in respect of the service she wanted the service actually offered by Charlie. As will be described below, Bob can indicate this by setting a "relay" flag in the hsR message and it is then up to Alice to decide whether she wishes to access Charlie by tunneling through Bob.

Choice of Cryptographic Algorithm.

There remains the issue of how Alice and Bob choose the cryptographic algorithms to use. First, considering the cryptographic functions used in the key exchange protocol itself, it will be recalled that selection of the DH group has already been made flexible with the group chosen by Alice being communicated to Bob. As regards the digital signatures, the various public keys and signatures all use their own algorithm so that if, for example, Alice has a DSS signature key to sign $SIG_A$, then Bob has to know how to verify a DSS signature. However, it is assumed that all public keys and signatures are encoded in such a way that their type can be recognised by the recipient and that the recipient will be able to handle at least the most common types.

With regard to the cryptographic algorithms to be used for the secure channel once established, there are many possible choices (though generally symmetric key algorithms will be used for encryption/decryption as they are much faster than asymmetrical algorithms). The solution here employed for choosing which algorithms to use is similar that adopted in SSL 3.0 and involves centrally defining cipher suites where each cipher suite is a full set of cryptographic algorithms for the secure channel. Each cipher suite is assigned a unique identifier by a central authority. During the key exchange protocol Alice and Bob negotiate a suite to use. Alice sends a list of suites she is willing to use, in decreasing order of preference. Bob selects one of the suites on the list and informs Alice of his choice. This is the suite that both will use.

Figure 8:
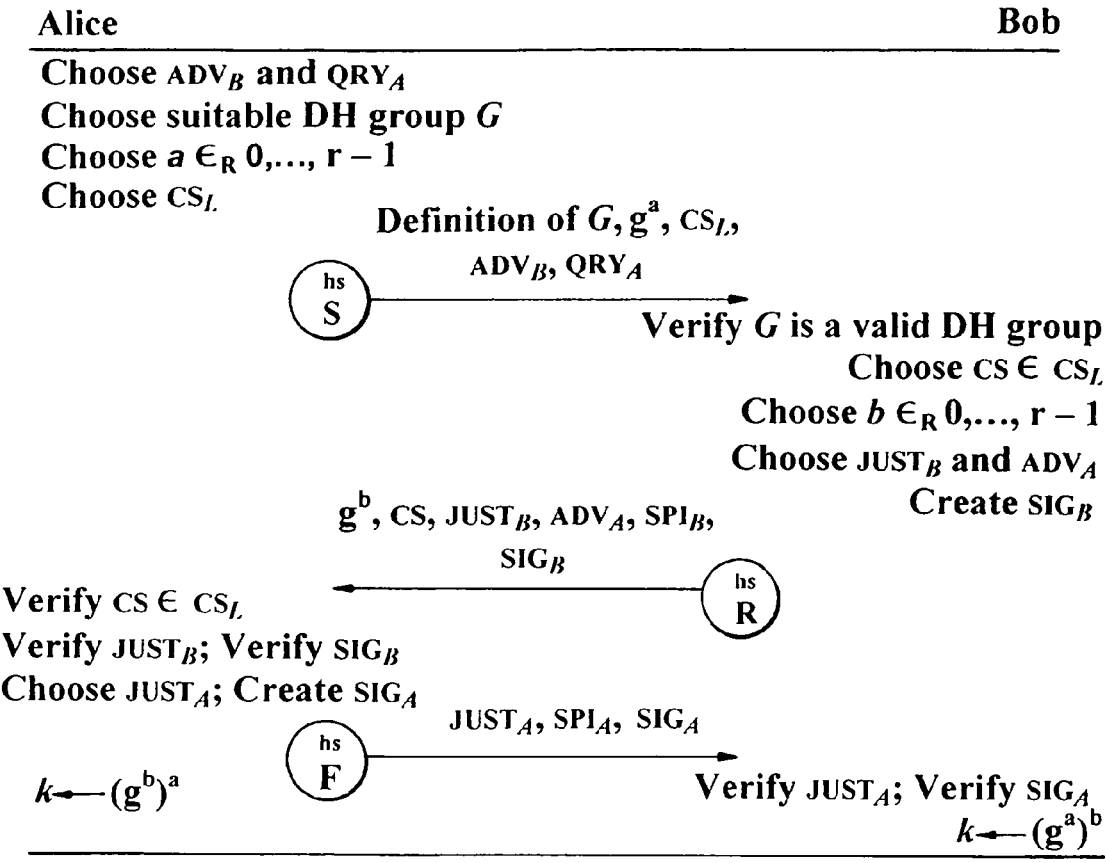
FIG. 8 is a diagram showing the FIG. 7 protocol with cipher suite negotiation added.

FIG. 8 shows the necessary addition to the protocol thus far built. Alice chooses a list of cipher suite identifiers $CS_L$. This list is in decreasing order of preference. This list is sent in the first message hsS to Bob. When Bob receives the list he selects one of the cipher suites. Bob should choose the first cipher suite in the list that is acceptable for him. This is the cipher suite that will be used for the secure connection. Bob sends his selection CS in the second message hsR to Alice, who in turn cheeks that this selection is valid. An example of one possible combination of algorithms making up a cipher suite is given hereinafter when describing the secure channel.

Final Handshake Protocol

Figure 9:
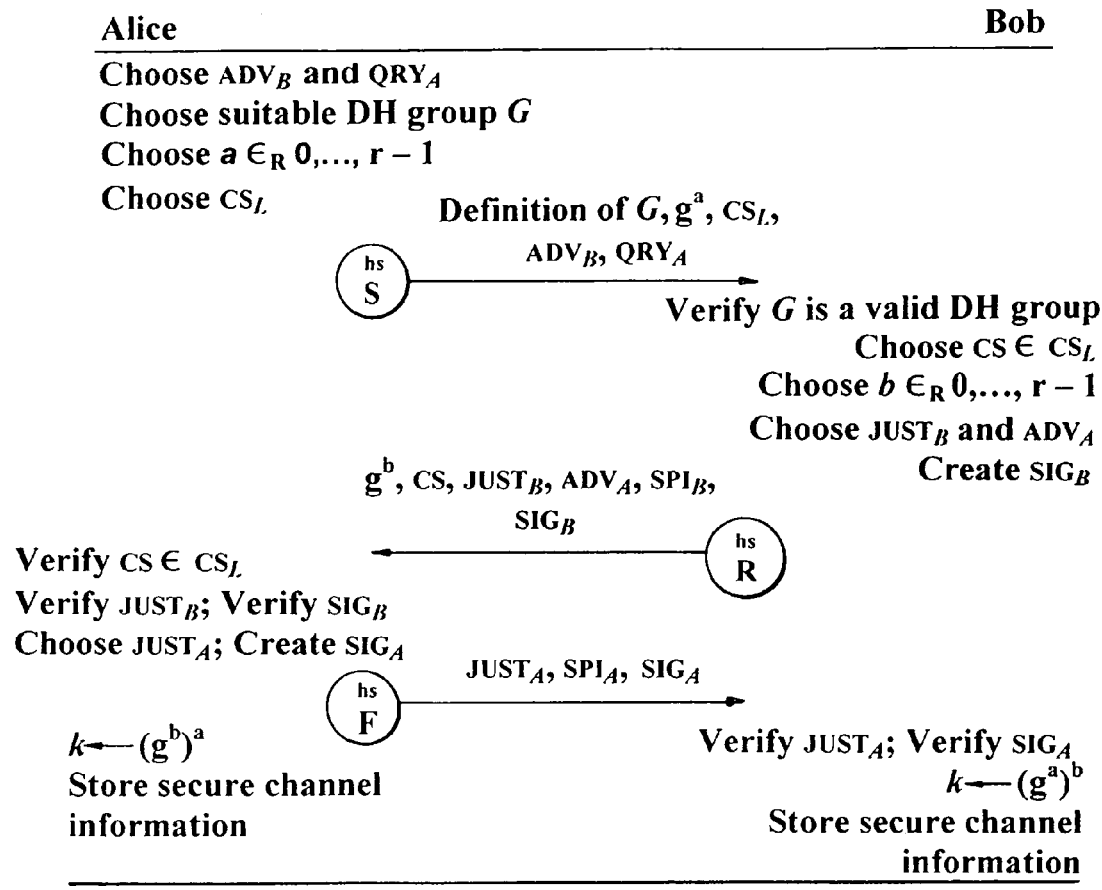
FIG. 9 is a diagram of the SLS key exchange handshake protocol.

The final key exchange handshake protocol is shown in FIG. 9. This is identical to that depicted in FIG. 8 except for the added operation of storing the information required for the secure channel (for FIG. 1, this would be in session memory 27). This information is the result of the protocol.

Alice would typically store a communication address that will reach Bob, the list of attributes that Bob showed to Alice in the protocol, the list of attributes that Alice showed to Bob during the protocol, the validity periods and conditions of the various attributes, and the shared secret key k. Bob would store similar information.

It will be appreciated that the handshake messages are incorporated into PDUs by SLS PDU processor 28 before transmission, the message type of such PDUs being set to HANDSHAKE.

The key exchange protocol was initiated by Alice to be able to send a message to Bob. Note that Alice has all the information about the secure channel before she sends the last message hsF in the protocol. It is therefore possible for Alice to send the first message on the secure channel in the same PDU as the last message of the key exchange protocol. This is a preferred implementation as it can result in a significant overhead reduction; this requires the use an appropriate message format that allows the last message of the key exchange protocol to co-exist with the first message on the secure channel (the design of such a format is within the competence of persons skilled in the relevant art).

Application Identification Field.

With respect to the signing of messages in the foregoing key exchange protocol, it should be remembered that what is being signed is a string of bytes; it is important that this string is parsable back into the original fields in a consistent manner. It is also important to know what the recovered fields mean and this depends on the application, the protocol that is being executed, and even the message within the protocol in which the signature is contained. Sometimes a signature is used for identification, sometimes it is used for authentication. A signature can imply a legally binding contract, or just an approval for the message to traverse the firewall. Preferably, therefore, every message that is signed starts with an identification field that uniquely identifies the application in which it is used, and its function within the application. The application can be identified with its application name and version number. The function of a signature within an application is usually identified by indicating the protocol within the application in which it is used and the message within this protocol in which it is used.

Where such an initial identification field is used, the parsing rule for this field must be the same across all applications that use the same key. For example, the following rules can be used for this identification field.

1. The field is an ASCII string of characters without any control sequences.
2. The string consists of the application name, protocol name, protocol version, and name of the signature within the protocol. (Applications that store signatures on disk will, of course, require a different identification scheme but should still use a string that starts with the application name to avoid collisions).
3. Each string of bytes that is signed starts with the length of the identification string encoded as a 2-byte integer in network order (MSByte first), followed by the identification string in question.

As an example, consider the signatures in the above-described key exchange protocol. A suitable identification string for $SIG_B$ would be "Hewlett-Packard/e-speak; client-resource key exchange protocol, version x/date; sigB". This identifies the application, the protocol and version number, and the function within that protocol. (The date is included in the version information to ensure uniqueness.) The identification string for $SIG_A$ could be similar: "Hewlett-Packard/e-speak; client-resource key exchange protocol, version x/date; sigA". Note that the overhead of this identification field is very low. The application simply starts every string to be signed or verified with a fixed sequence of bytes (which include the 2-byte length encoding).

The Secure Channel

The key exchange handshake protocol described above is performed in order to establish a secure channel between Alice and Bob. As will be seen, this secure channel has the following features:

1. Messages on the secure channel are authenticated. Alice will only accept messages that were sent by Bob and vice versa.
2. Messages are encrypted: an eavesdropper cannot determine the contents of the message being sent.
3. The sequence of message that Alice receives is a subsequence of the messages that Bob sent, and vice versa. This prevents replay attacks, reflection attacks, etc. Note that the channel does not guarantee that every message will be delivered, only that they will not arrive out of order.

The encryption and authentication functions of the secure channel use symmetric key cryptography and are therefore orders of magnitude faster than public-key functions.

The secure channel has a limited life-time. The attributes shown in the key exchange protocol typically have a limited validity period. The validity periods of the attributes exchanged are held in the session memory and checked regularly by the control block 26 (for example, before each message is processed. When these attributes expire the key exchange protocol will have to be re-run to set up a new secure channel. As a general rule, either party is free to discard the information relating to a secure channel at any time. This could, for example, be done when the first attribute associated with the channel lapses, when there has been a significant period of time without any activity on the channel, or when the application signals that it will no longer need the channel. Preferably, when the protocol engine 23 decides to discard a channel, it sends a corresponding message to the other side of the channel; this message should of course be authenticated in the same way as all other messages.

To ensure proper error handling, the SPI numbers should not be recycled too rapidly by the protocol engine 23. If a message is received for an unknown SPI this will be signaled as such. If the SPI has been re-used, the message will generate an authentication-failure error, which does not provide the sender with the information that the old channel has been discarded.

The secure channel makes use of four functions in the selected cipher suite, namely a hash function h0, a MAC function MAC(), an encryption function E() and the associated decryption function D(); the algorithms used for each function is determined by the cipher suite chosen for use. One possible cipher suite comprises:

| Hash function: | SHA-1 (see Reference [5]) |
| --- | --- |
| MAC function | HMAC-SHA1-96 (see Reference [6]) |
| Encryption/Decryption | 3DES in CBC mode (see References [7], [8]) |

Deriving Key Materials.

The MAC function has two associated authentication keys and the encryption/decryption functions have two associated encryption (and decryption) keys. For deriving the authentication and encryption keys it is convenient to define a further function, namely a helper function h' that is used in conjunction with the hash function. More particularly, the hash function h maps arbitrary length input strings to a output strings of a fixed length. The length of the output string is fixed for any function h, but it depends on the choice of that function. The helper function h' provides a variable-length output and is part of the services provided by the cryptographic services block 22.

Given an input string s and a desired length l, h'(s, l) is defined as follows:

$s_o := h(s)$ $s_i := h(s_0|s_1|\ldots|s_{i-1}|s) i \geq 1$ $h'(s,l) :=$ The first l bytes of $s_0|s_1|s_2|$ where | is used to denote concatenation of strings. The hash function h is used repeatedly to generate enough output, and then take the l leading bytes are taken.

The construction has been chosen to ensure that the entropy of the result is not limited by the output size of the hash function or by the internal state size for a standard iterative hash function.

The encryption algorithm from the chosen cipher suite specifies the length of the encryption keys. The MAC algorithm from the chosen cipher suite specifies the length of the authentication keys.

The result of the key exchange protocol is a shared group element k. This must first be converted to a string using a canonical binary representation. The group definition should define such a canonical representation. We will call the canonical representation $k_s$.

The encryption keys are called $K^E_{AB}$ for the key that will encrypt traffic from Alice to Bob and $K^E_{BA}$ for the key that will encrypt traffic from Bob to Alice. Similarly the authentication keys will be called $K^A_{AB}$ and $K^A_{BA}$. Let $l_A$ be the length of the authentication keys and $l_E$ the length of the encryption keys (as specified by the respective authentication and encryption algorithms). We now define $K^A_{AB} := h'(\text{``Authenticate Alice to Bob''}|k_s, l_A)$ $K^A_{BA} := h'(\text{``Authenticate Bob to Alice''}|k_s, l_A)$ $K^E_{AB} := h'(\text{``Encrypt Alice to Bob''}|k_s, l_E)$ $K^E_{BA} := h'(\text{``Encrypt Bob to Alice''}|k_s, l_E)$ where the literal strings are plain ASCII strings (without any terminating zeroes).

Typically, both Alice and Bob will store all four keys in their session memories 27.

Sequence Counters.

One generic attack against a protocol is to resend an old message. If the message is only authenticated then it will be accepted as real by the recipient. There are various ways in which replay attacks can be avoided. Here a sequence counter is used.

Alice keeps a sequence counter $c_{AB}$ for the messages that she sends to Bob over the secure channel. This counter starts at 1 for the first message and increments for every message that Alice sends. Bob keeps track of the $c'_{AB}$, namely, the largest counter value he has seen in a proper message. If a new message arrives, and the MAC code checks out, Bob compares the counter value c in the message with $c'_{AB}$. If $c \leq c'_{AB}$ then the packet is at least as old as the last accepted message, and it is discarded. If $c > c'_{AB}$ then this is a newer message and the variable $c'_{AB}$ is set to the value c. It is easy to see that this rule prevents Bob from ever accepting the same message twice, or accepting messages out of order. Of course, for messages from Bob to Alice the same mechanism is used with Bob keeping a counter $c_{BA}$ and Alice keeping the largest valid counter value yet $c'_{BA}$.

Note that the first counter value that is sent in a message is 1. This allows the recipient to initialize the c' variable to 0 and proceed as normally.

It is generally good practice to limit the amount of data that is encrypted or authenticated with a single key. For example, for a 64-bit block cipher the number of blocks encrypted with any single key should not exceed $2^{32}$. This implies that the range of the sequence counters can be limited, for example to 32-bit unsigned integers. This allows $2^{32}-1$ messages to be sent on the channel. If this limit is ever reached, the secure channel has to be abandoned and a new channel negotiated using the key exchange protocol. Note that both Alice and Bob have to ensure that the counter values do not wrap around. Either party can also impose their own more strict limit and abandon the secure channel earlier. A new channel can always be negotiated.

Advantageously, the sequence number c of a message is provided to both the encryption (and decryption) block and the MAC block (in the case of the latter, this is in addition to c being included in the data in respect of which a MAC is to be formed). This is done to enable the use of certain encryption and MAC functions (if agreed by the parties) which have the potential of being faster. For example, if a stream cipher is used, care has to be taken that every message is encrypted with its own unique key stream. The counter value allows the stream cipher to ensure that this is the case. It is also possible to have MAC functions that are very fast, but which can only be used once for each key. The counter value c can be used to derive unique authentication keys for each message from the channel authentication key.

Message Transform by Sender

Figure 10:
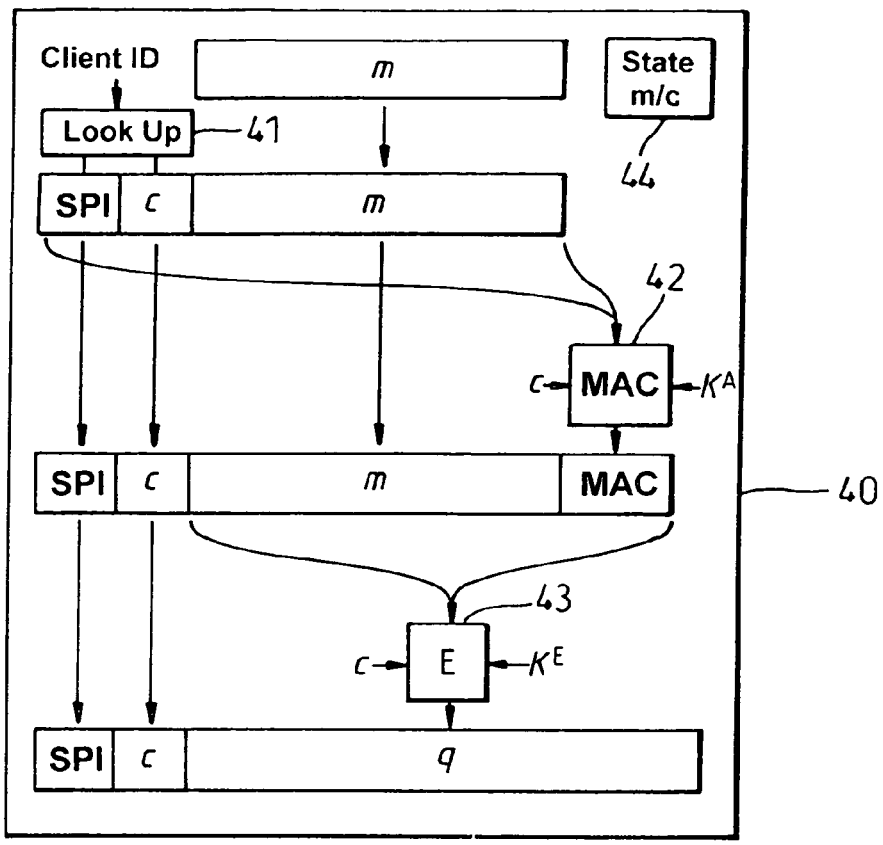
FIG. 10 is a diagram of a sending subsystem of the secure channel functional block of the SLS entity of FIG. 1.

The processing of a message m at the sending end of the secure channel will now be described with reference to FIG. 10 which depicts the main functional processing blocks of the secure-channel sending sub-system 40 and the message transform they each effect. As well as the message m the sending sub-system is supplied with a reference enabling it to retrieve the relevant session data (block 41); this data includes the sending sequence number c, the cipher suite and session keys to be used, and the SPI value for the recipient (thus Alice will use $SPI_B$ for messages she sends to Bob). The message m is usually variable-length, while c and SPI are fixed length (here assumed as 4 bytes).

First, $MAC := MAC(K_A, c, SPI|c|m)$ is computed (that is, the MAC function is applied to the string consisting of the concatenation of SPI, c, and m—see block 42). The appropriate authentication key $K_A$ and the counter value c are also inputs to the MAC function.

Encryption is effected next (block 43) by computing q:=$E(K^E,c,m|MAC)$; in other words, the message m and the MAC field are concatenated and then encrypted using the appropriate encryption key $K^E$ (with the counter c being an additional input to the encryption function as already explained). The result of the encryption is called q. There is no direct relation between the length of m, MAC, and q. Many encryption algorithms require padding, which increases the length, and some might implement compression which could reduce the length. Note that here the padding is considered to be part of the encryption function as the padding requirements depend on the details of the encryption function being used. Note that the encryption step can result in an increase in overall message length.

The message (PDU) that is finally sent consists of the concatenation of SPI, c, and q plus certain additional information, such as addresses, as already described in relation to the fields 36, 37 and 38 of PDU 35 of FIG. 1. The assembly of the PDU is the responsibility of the SLS PDU processor 28.

The overall operation of the sending subsystem is coordinated by a state machine 44.

Message Transform by Receiver

Figure 11:
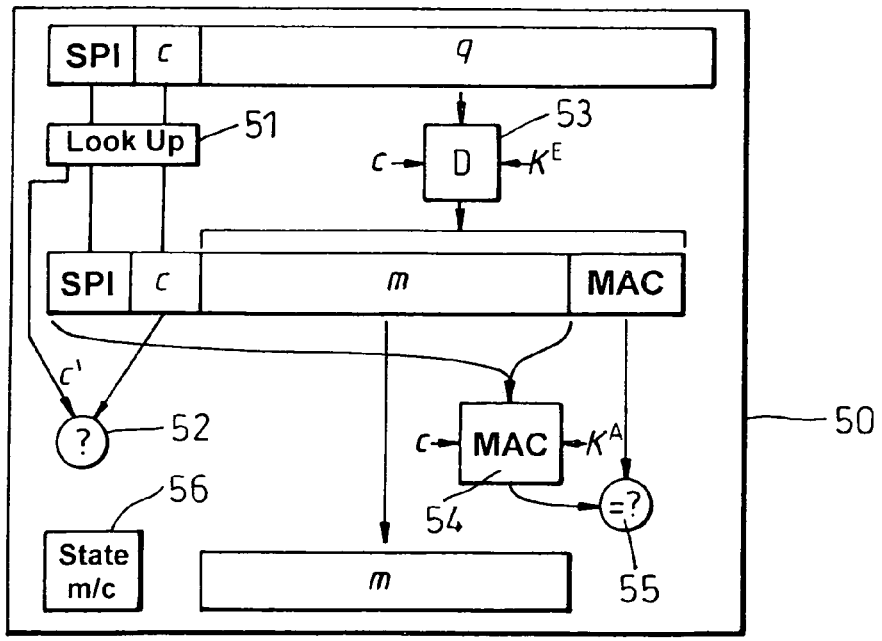
FIG. 11 is a diagram of a receiving subsystem of the secure channel functional block of the SLS entity of FIG. 1.

At the receiving end of the secure channel, on receiving a message from the transport entity 14 (FIG. 1), the SLS PDU processor 28 disassembles the message and passes SPI, c, and q to a receiving sub-system 50 (see FIG. 11). Even though it would be possible to arrange for the message delivery layer to provide some information about the originator of the message to higher processing layers, all such information should be discarded as it has not been authenticated. Once the received message has been authenticated the sender information can be reliably looked up in the secure channel information.

The received SPI is used by the receiving sub-system to find its internally-held information about the secure channel in question (block 51). Since the SPI has not yet authenticated, the sub-system needs to be robust and not crash even if the SPI is corrupted. For this reason, the SPI value should not be chosen as the memory address of a secure channel data structure holding the required information about the channel; the SPI value can, however, be chosen as an array index provided appropriate range checks are implemented during the lookup.

The secure channel information provides the keys that will be used for the decryption and authentication verification. The first step is to decrypt the message (block 53). The field q is the ciphertext which is passed to the decryption function of the current cipher suite (also specified by the secure channel information). The decryption function also takes the counter value c and the appropriate encryption key from the channel information as inputs. The result is a single string, which is split into the m and MAC fields using the known length of the MAC field (defined by the MAC function of the cipher suite).

The value of the MAC field is then checked by re-computing the appropriate MAC value from the SPI, c and m field using the authentication key $K^A$ (block 54) and comparing it with the value in the MAC field (block 55). If these two values are different, the message does not pass the authentication check and is discarded.

Once the message has been authenticated the receiving sub-system performs its checks on the counter value (block 52), and updates its own c' value. If desired, the check that c is greater than the current c' can be done before decryption and authentication. However, updating the c' variable must only be done after authentication has been completed.

The overall operation of the receiving subsystem is coordinated by a state machine 56.

Tunneling

The SLS protocol supports tunneling, that is, the passing of PDUs through an access-controlling intermediate system to a final destination. PDUs that are to be tunneled are encapsulated in SLS PDUs which have their message type (field 37, FIG. 1) set to TUNNEL. Tunneling requires the consent of the intermediate system concerned as will be more fully explained below with reference to FIG. 12.

Figure 12:
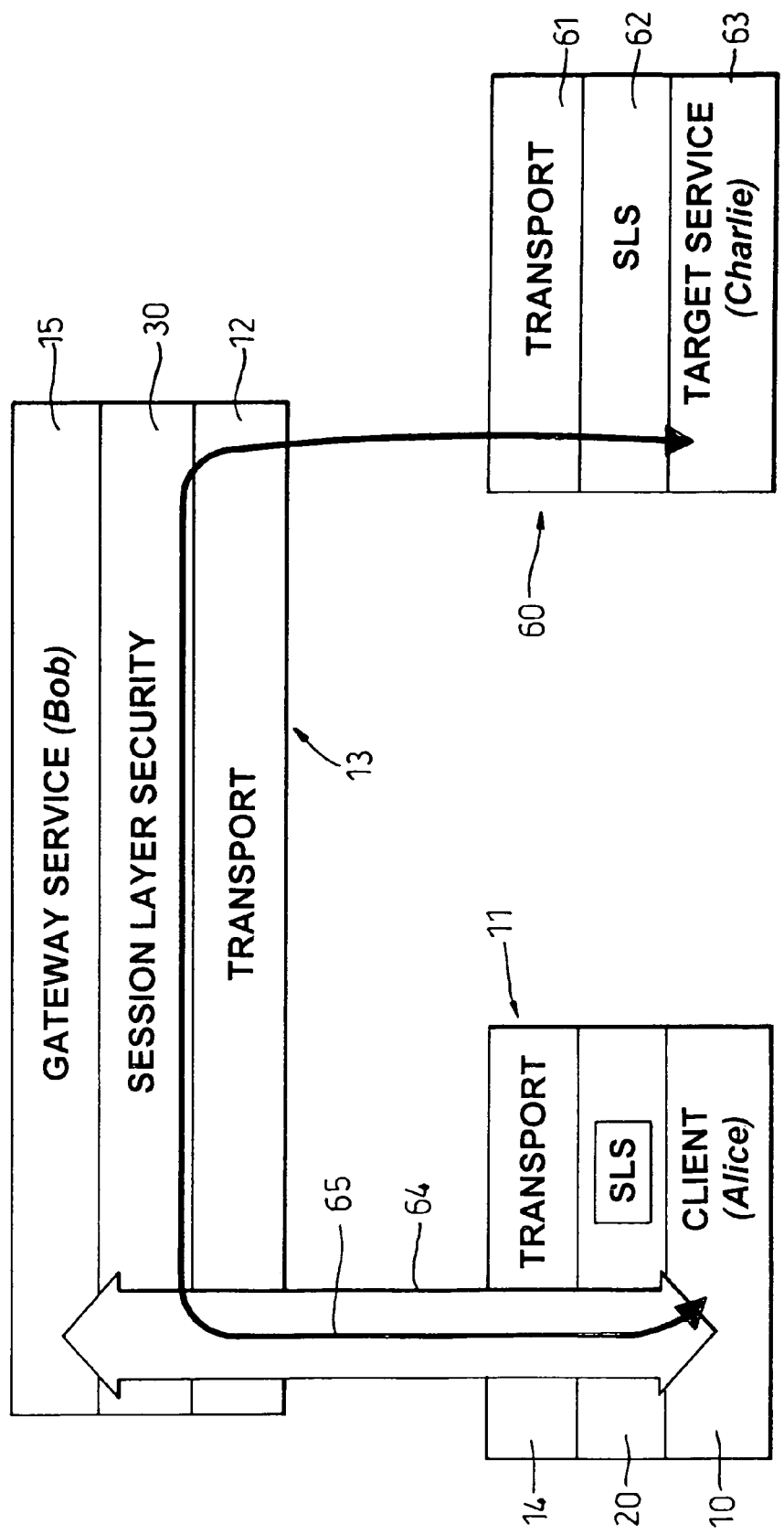
FIG. 12 is a diagram depicting tunnelling supported by nested sessions established by an SLS protocol entity.

As before, suppose the parties to the SLS handshake are Alice and Bob, with Alice initiating as client. When Alice sends a handshakeStart message to Bob she is expecting a handshakeReply from Bob that includes Bob's proof of the attributes Alice required of him. However, sometimes Bob is not in a position to supply the proof—for example, consider the case where Alice has the address of a service that appears to reside at Bob, but Bob is in fact a mediator (gateway application) for the service and forwards requests to another party, Charlie, who implements the service. Charlie is shown in FIG. 12 as a system 60 composed of a transport entity 61, an SLS entity 62 and a service 63. If Bob has no security restrictions of his own he can simply forward messages unchanged in both directions, and Alice and Charlie can set up a SLS session. If necessary, Bob can rewrite the to and from addresses of the messages to get them delivered to the right place. This is because the 'to' and 'from' addresses are not protected by the handshake signatures or MACs (they are in the header field 36). Everything else is protected.

Assume now that Charlie has allowed Bob to broker the service provided by Charlie and also to impose his own access restrictions. This means that Bob wants to check Alice's attributes before forwarding messages to Charlie. In order to check Alice's attributes Bob has to set up a SLS session with her. But since Bob is not the real service he may well be unable to prove to Alice the properties she requires of the service. This possibility is provided for in the SLS protocol by including a 'relay' flag in the handshakeReply message hsR sent by Bob to Alice.

When the relay flag is true, Bob is telling Alice that he is a mediator, and so may not be able to prove all Alice's required attributes. It is up to Alice whether this is acceptable. If it is, she can complete the handshake and set up a session with Bob (the Alice-Bob session 64). Alice now needs to set up a session with the entity Bob is relaying to—Charlie in this case (the Alice-Charlie session 65). Alice does this using Alice-Bob session PDUs of message type TUNNEL. These PDUs carry, as payload, PDUs for the Alice-Charlie session 65 (effectively a nested session within the Alice-Bob session). The PDUs for the Alice-Charlie session contain the messages (initially, handshake messages but subsequently encrypted message data), and the unencrypted PDU fields 36–38—since this information will be visible as such on the Bob-Charlie connection, there is no great benefit in Alice encrypting the payload of the Alice-Bob session PDUs and this step can therefore be omitted to reduce processing overhead though forming a MAC for this payload should still be done. When Bob receives an Alice-Bob session PDU with its message type set to TUNNEL, he forwards its payload as a PDU to the mediated entity (Charlie). Bob performs the security processing negotiated for his session with Alice in the usual way. If Bob receives a PDU from Alice with message type set to APPLICATION rather than TUNNEL, Bob assumes the message is for him and attempts to decrypt the payload of the PDU in the usual way.

Alice now sets up the Alice-Charlie session 65 with Charlie. Notice that once a secure channel has been set up between Alice and Charlie, then assuming Alice encrypts the payload of the Alice-Charlie session PDUs, Bob will not be able to read the payload being passed to Charlie. All he will be able to see is the header fields 36–38.

In controlling tunneling, the control block 26 of the protocol engine 23 of Alice's system (the sending system) needs to keep a track of the session nesting. This can be done by including in the data stored for each session the SPI of any immediately-nested session. Thus for the FIG. 12 example, the session data for the Alice-Bob session 64 (which would generally be the session data initially retrieved by control block 26 when Alice indicates she want to send a message to Charlie) would show that the session was with Bob, not Charlie, and that there was a nested session with a stated SPI (being the SPI of the Alice-Charlie session 65). This tells the control block 26 that when sending data to Charlie the Alice-Bob session 64 is simply acting as a channel for a nested session with the consequence that the PDUs of session 64 should be set to type TUNNEL (the question of whether or not the payload of these PDUs is to be encrypted can be set by policy, by choice of cipher suite, or by an explicit flag set in the session data). The control block 26 next looks at the data for the session corresponding to the SPI in the Alice-Bob session data, namely the Alice-Charlie session data; this indicates that the receiver is Charlie (the required recipient) so that the PDUs for this session will have a message type APPLICATION and the payload will be encrypted.

If Alice wants to send a message to Bob, then when the control block looks up the session data for session 64, it can see that the recipient is Bob and so PDUs can be set directly to APPLICATION and there is no need to use any nested sessions; in other words, the control block does not need to concern itself with the fact that session 64 carries a nested session as indicated by the session 65 SPI in the session 64 data.

As already indicated, handling of tunneling by the recipient (Bob) of a PDU of the message type TUNNEL is very simple and does not require any tracking mechanism—the recipient simply take the payload of the received PDU, carries out any MAC based checking need (as indicated by the encoding type field 38) and forwards the payload (minus MAC, if present) to the entity (Charlie) indicated in the "to" address included in the header field 36 that forms part of the payload of the received PDU. Of course, the address of this entity is probably not known to Alice and Bob must supply this address, inserting it in the "to" address of the PDU to be forwarded. The address of Charlie is conveniently held by Bob in his session data for the Alice-Bob session ready for use when a TUNNEL PDU is received from Alice. Bob will generally also set the "from" address to show that the message is from him.

Although the forgoing example of tunneling concerned only two nested sessions, any number of nested sessions are possible.

SLS Using XML

An XML DTD (Document Type Declaration) for a preferred structure of an SLS PDU is given in the Appendix to be found at the end of this description. XML is a markup language details of which can be found in Reference [9]. An XML DTD describes the structure of a document and may be appended at the beginning of the document concerned. XML is finding rapid acceptance as a markup language for World Wide Web documents as it permits much more richly structured documents than is possible with HTML. As a result, many web browsers are now XML capable.

Figure 13:
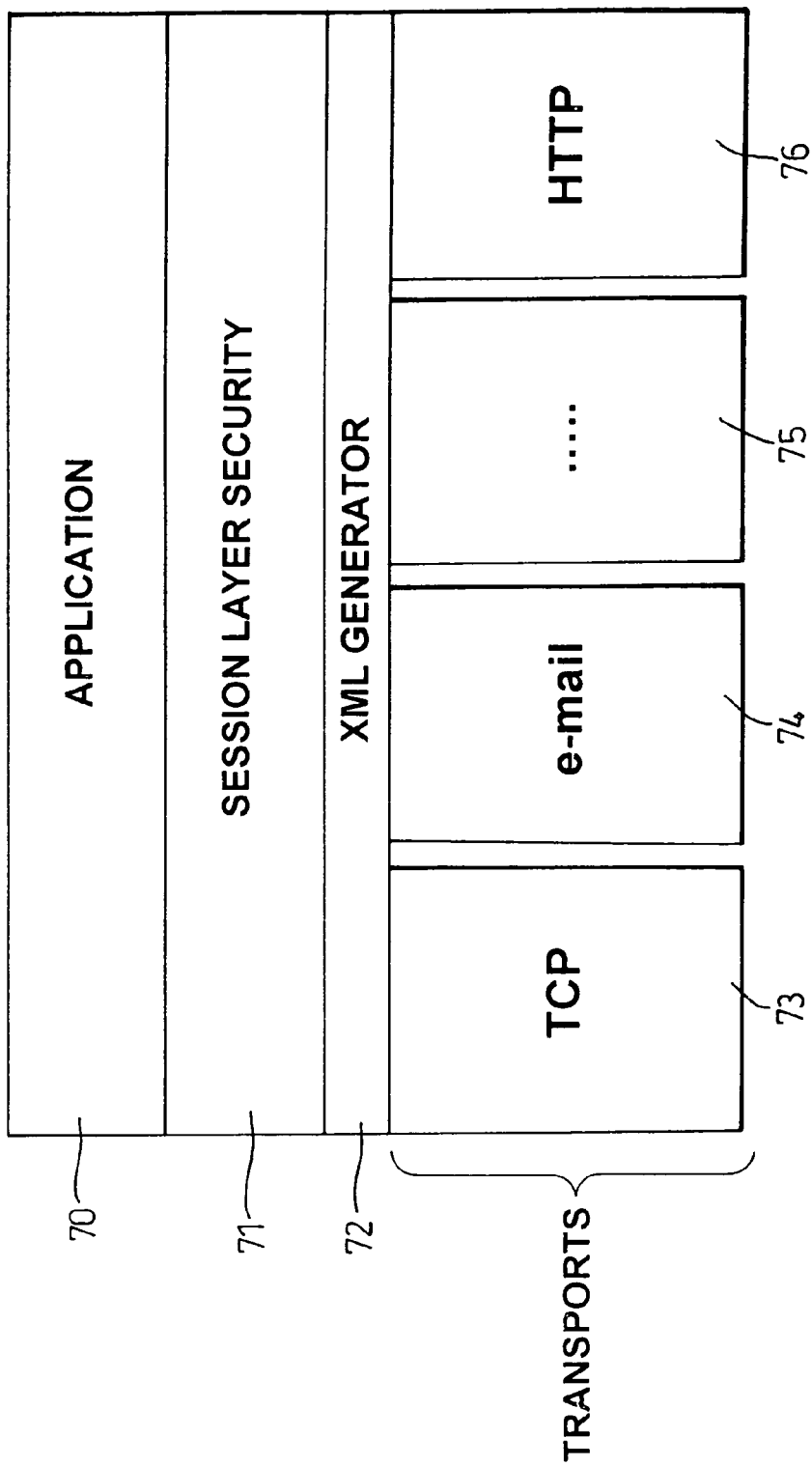
FIG. 13 is a protocol stack including an XML generator layer below an SLS layer.

By defining an XML DTD for SLS PDUs, it becomes possible to effect the SLS protocol exchanges as XML documents, the latter being transportable over a wide range of transports including HTTP and e-mail. FIG. 13 depicts an end system in which an SLS layer 71 provides secure session services to an application.; interposed between the SLS layer and the transport layer is an XML generator layer 72. The transport layer comprises a set of transports 73–76 (including TCP transport 73, e-mail transport 74 and HTTP transport 76). The XML generator layer converts the SLS PDUs into XML documents that can then be transported by any of the indicated transports (among others). At the receiving system, an XML interpreter reforms the PDU into the form familiar to the SLS layer.

It is possible to use another self-describing markup language in place of XML including SGML (Standard Generalized Markup Language) though only larger systems tend to provide support for this latter markup language.

"E-Speak" and SLS

An intended application of the above-described SLS protocol is in providing security to Hewlett-Packard's "E-speak" technology. It is useful in understanding the capabilities of the SLS protocol to consider examples of how the protocol can be deployed with such technology. A brief overview of the E-speak technology is given below to aid an understanding of the SLS deployment; a more detailed exposition of the technology can be found at reference [10].

E-speak deals in terms of "resources" described by metadata. The metadata defines resource type, attributes and security properties. Resource metadata is registered with a repository in an e-speak daemon known as a "core"; this metadata can be exported from core to core. An active service registers itself as the handler for a resource with a core which then forwards messages for the resource to the handler. For present purposes, the handler and resource will be treated as equivalent to a "service" application such as the service 15 of FIG. 1; also, for simplicity, the resource and handler will not be distinguished and are jointly referred to below as a "resource".

A client typically connects to a core, does an attribute-based lookup to find a resource and then is able to invoke the resource. The core passes messages from the client to the resource. All resources are referred to by name.

Figures 14, 15:
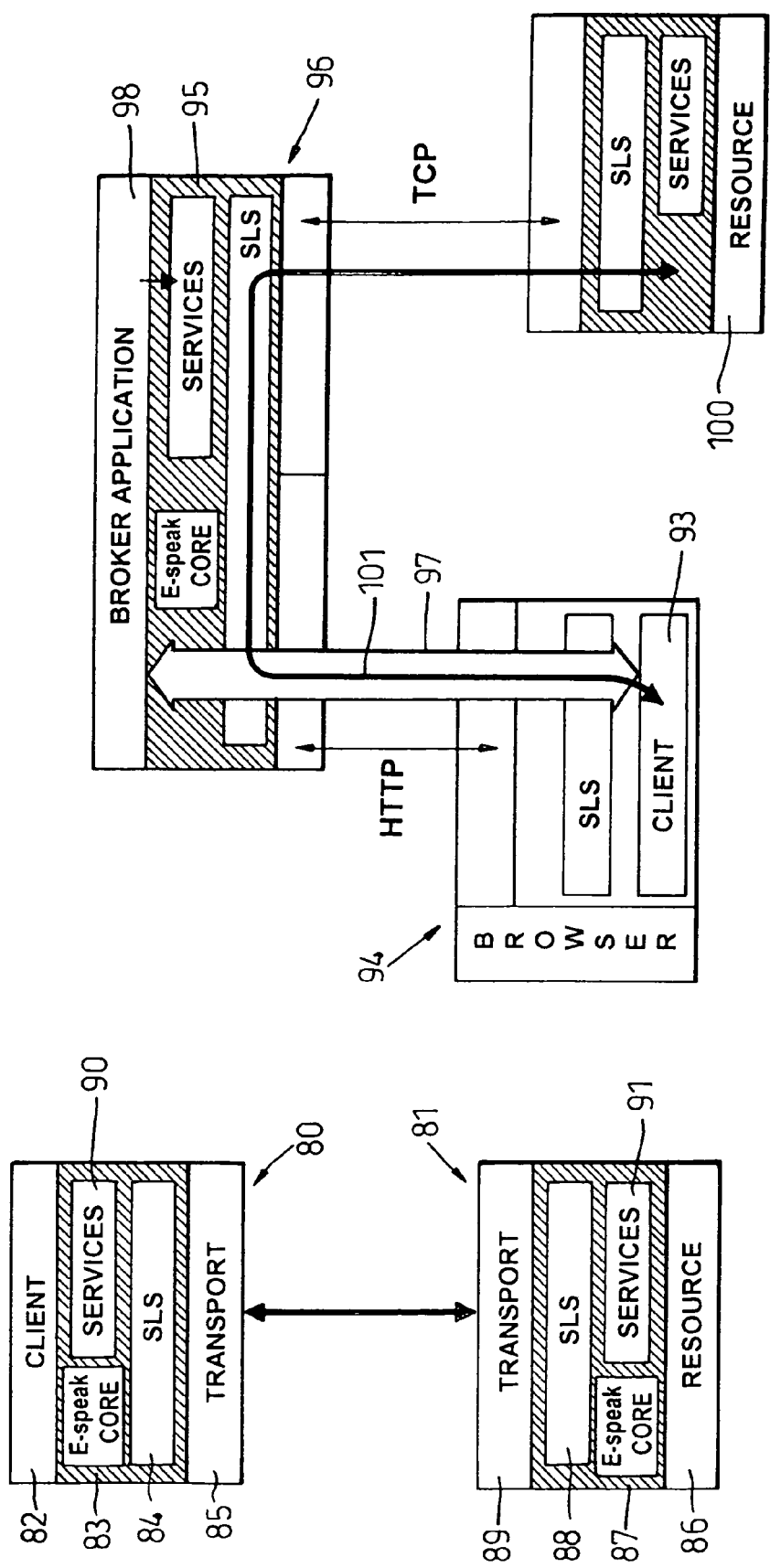
FIG. 14 is a diagram illustrating the use of SLS entities in resource mediation environment.
FIG. 15 is a diagram illustrating the use of an SLS plug-in in a web browser for establishing a secure session with a resource mediation environment on a broker server.

The SLS layer is intended to form a part of an e-speak core to provide security (access control and confidentiality) for communication between a client and a resource. FIG. 14 depicts this situation where a client end system 80 communicates with a resource system 81. The client end system comprises the client application 82, an e-speak core 83 including SLS layer 84, and a transport entity 85. Similarly, the resource system comprises a resource 86, an e-speak core 87 with SLS layer 88, and a transport entity 89. The e-speak cores are shown hatched for clarity. The functionality provided by the e-speak cores 83,87 in addition to that provided by the SLS layer, is represented by respective services blocks, 90 and 91; this additional functionality includes resource registration, metadata export, and resource discovery. Once the client 82 has determined by reference to core services 90 that resource 86 can provide a desired service and is likely to allow the client access, the client can seek to establish a secure session with resource 86 using the services of the SLS layers 83 and 88 in the manner previously described, The client and e-speak core may not, however, always reside on the same end system. For example, a client may simply be a small application 93 running in a web browser 94 (see FIG. 15) with the most convenient e-speak core 95 being one hosted by a broker system 96 connected to the web. By providing browser 94 with an SLS XML plug-in, client 93 can establish a secure session 97 over an HTTP connection with broker application 98 running on system 96 and make use of core 95 to locate a target resource 100. The client can then establish a nested session 101 with the resource 100, tunneling through the broker system; the connection between the broker system and the system running resource 100 is, for example a TCP connection. Of course, setting up the sessions 97 and 101 requires the participating parties to prove required attributes to each other in the manner already explained when describing the SLS protocol.

Figure 16:
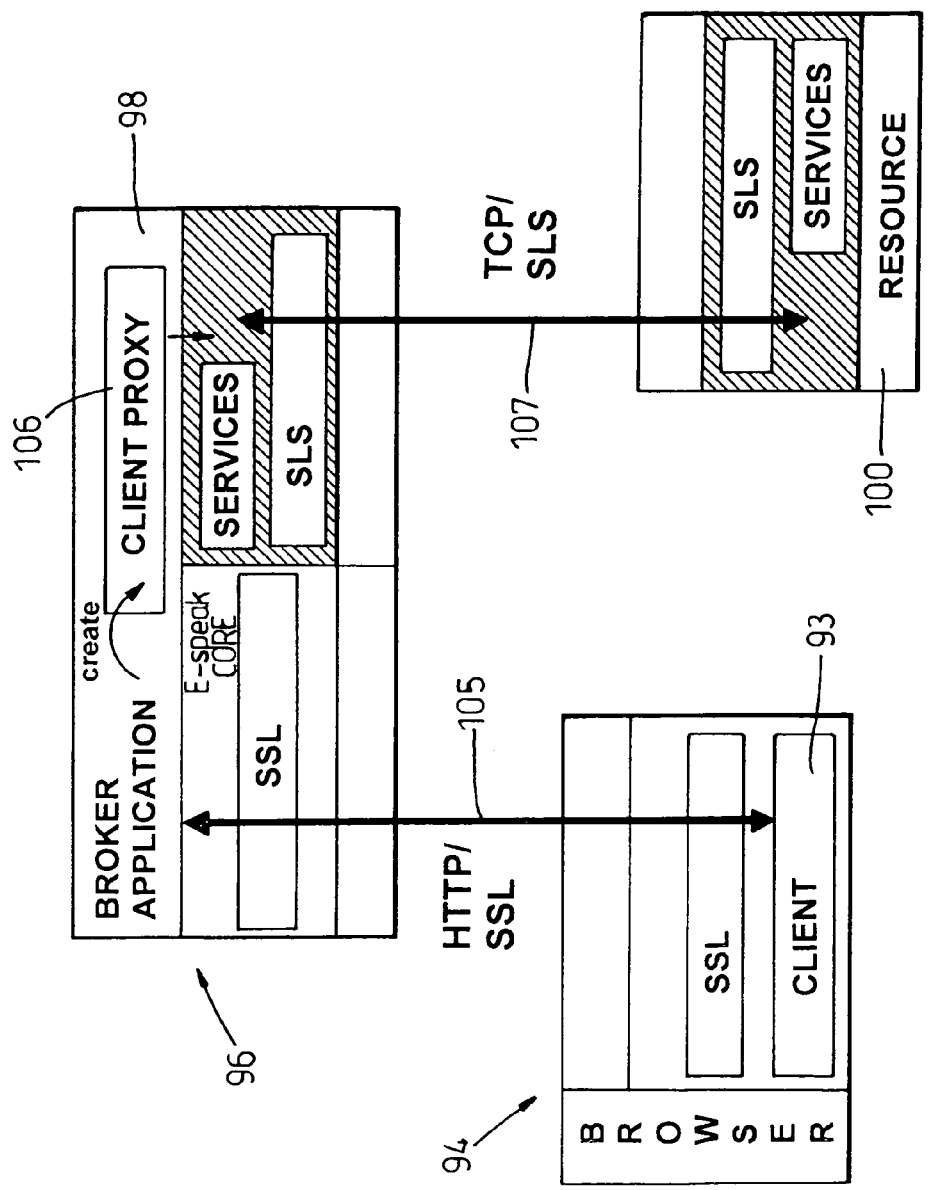
FIG. 16 is a diagram similar to FIG. 15 but showing the use of an SSL connection to provide a secure path between the web browser and broker server.

It may not always be acceptable to install an SLS plug-in into a web browser. In this case the client running in the browser could use an HTTP/SSL secure connection 105 (see FIG. 16) to talk to the broker application 98 with the broker authenticating the client by any suitable method (client side certificates, basic authentication or digest authentication). The broker application 98 then creates a client proxy 106 to represent the client 93 in an SLS session 107 established using the e-speak core 95 on the broker system 96 to the resource 100. It will not be a secure end to end session between the web browser and the resource 100 as the proxy has to be trusted.

REFERENCES

[1] T. Dierke et al., "The TLS Protocol, Version 1.0", IETF RFC2246 January 1999.
[2] C. Ellison et al., "SPKI Certificate Theory", IETF RFC2693 September 1999.
[3] C. Ellison et al., "SPKI Examples", IETF RFC 2692 September 1999
[4] S. Kent et al., "Security Architecture for the Internet Protocol" IEFT RFC 2401 November 1998.
[5] National Institute of Standards and Technology. *Secure Hash Standard*, Apr. 17, 1995. FIPS PUB 180-1, available from http://www.itl.nist.gov/fipspubs/.
[6] Mihir Bellare, Ran Canetti, and Hugo Krawczyk. "Keying hash functions for message authentication". In Neal Koblitz, editor, *Advances in Cryptology—CRYPTO '96*, volume 1109 of *Lecture Notes in Computer Science*, pages 1–15. Springer-Verlag, 1996.
[7] National Institute of Standards and Technology. *Data Encryption Standard (DES)*, 1999. DRAFT FIPS PUB 46-3, available from http://www.ncsl.nist.gov/fips/.
[8] National Institute of Standards and Technology. *DES Modes of Operation*, Dec. 2, 1980. FIPS PUB 81, available from http://www.itl.nist.gov/fipspubs/.]
[9] Tim Bray, Jean Paoli, C. M. Sperberg-McQueen "Extensible Markup Language (XML) 1.0 Specification", February 1998, available at http://www.w3.org/TR/REC-xml
[10] "E-speak Architecture Specification", Hewlett-Packard Company, September 1999 available at http://www.e-speak.hp.com/
[11] D. Harkins et al, "The Internet Key Exchange" IETF RFC 2409 November 1998

The invention claimed is:

1. A system with a local application entity and communications means by which the local application entity can communicate with peer remote application entities on other systems, the communication means including a transport entity for providing transport services, and a transport-independent, session-level security entity logically positioned above the transport entity and visible to the local application entity, the security entity being operative to set up secure communication sessions with peer security entities in other systems and comprising:

key-exchange handshake means for conducting a handshake with a said peer security entity associated with a particular remote application entity with which said local application entity wishes to communicate, this handshake involving the exchange of key-related data for use in generating session keys; and secure channel means for enabling messages to be passed between the local application entity and said particular remote application entity with authentication and/or encryption of these messages being effected using the session keys generated from said key-related data whereby to secure these messages in passage between the cooperating security entities;

the handshake means including:

first means, operative in the course of said handshake, to pass to said peer security entity a first indication in the form of explicit information about what services are required by the local application entity, to receive back from said peer security entity a second indication explicitly advising what specific attributes are required of the local application entity by the remote application entity for carrying out said services, to select on the basis of said second indication first attribute justifications in the form of one or more certificates from a set of available attribute justifications, and to pass the selected first attribute justifications to said peer security entity, and second means, operative in the course of said handshake, to pass to said peer security entity a third indication explicitly advising what specific attributes are required of the remote application entity by the local application entity, and to receive second attribute justifications, in the form of one or more certificates, from said peer security entity;

wherein said handshake as a three message handshake, the first message passing from the local security entity to said peer security entity and including said first and third indications, the second message passing from the peer security entity to the local security entity and including said second indication and said second attribute justifications, and the third message passing from the local security entity to said peer security entity and including said first attribute justifications.

2. A system according to claim 1, wherein the security entity is capable of establishing multiple concurrent security sessions with another system over a common transport connection set up by the transport entity.

3. A system according to claim 1, further comprising attribute justification means for proving from certificates received from the remote system during said handshake that the remote application has the required attributes.

4. A system according to claim 1, wherein said local application entity is a mediation entity acting on behalf of one or more other application entities.

5. A system according to claim 1, wherein the security entity formats its communications intended for the remote peer security entity in protocol data units (PDUs) that each include:

a session indicator enabling the peer security entity to determine to which security session the PDU relates; and a message-type field by which the peer security entity can determine whether the PDU carries handshake-related data or a message being passed over the secure channel of the security session indicated by said session indicator.

6. A system according to claim 1, wherein in the course of said handshake an authenticated ephemeral key exchange is effected, and a cipher suite is negotiated determining the authentication and/or encryption algorithms that will be subsequently used by the secure channel means for the security session concerned.

7. A system according to claim 6, wherein said authenticated ephemeral key exchange is a Diffie-Hellman key exchange.

8. A method of initiating secure communication between a local and a remote system wherein a security protocol handshake is effected between respective transport-independent, session-level security entities of the local and remote systems during which handshake key-related data is exchanged for use in generating session keys, the handshake further involving passing from the local security entity to the remote security entity a first indication in the form of explicit information about what services are required by the local system, passing from the remote security entity to the local security entity a second indication explicitly advising what specific attributes are required of the local system by the remote system for carrying out said services, selecting on the basis of said second indication first attribute justifications from a set of available attribute justifications and passing from the local security entity to the remote security entity the selected first attribute justifications in the form of one or more certificates, and passing from the local security entity to the remote security entity a third indication explicitly advising what specific attributes are required of the remote system by the local system, and passing from the remote security entity to the local security entity second attribute justifications, in the form of one or more certificates;

wherein said handshake is a three message handshake, the first message passing from the local security entity to said remote security entity and including said first and third indications, the second message passing from the remote security entity to the local security entity and including said second indication and said second attribute justifications, and the third message passing from the local security entity to said remote security entity and including said first attribute justifications.

9. A method according to claim 8, wherein in the course of said handshake an authenticated ephemeral key exchange is effected, and a cipher suite is negotiated determining the authentication and/or encryption algorithms to be subsequently used for secure communication between the local and remote systems.

10. A method according to claim 9, wherein said authenticated ephemeral key exchange is a Diffie-Hellman key exchange.

11. A method according to claim 8, wherein each security entity formats its communications intended for the remote peer security entity in protocol data units (PDUs) that each include:

a session indicator enabling the peer security entity to determine to which security session the PDU relates; and a message-type field by which the peer security entity can determine whether the PDU carries handshake-related data or a message being passed over the secure channel of the security session indicated by said session indicator.

12. A method of initiating secure communication between a local and a remote system wherein a security protocol handshake is effected between respective transport-independent, session-level security entities of the local and remote systems during which handshake key-related data is exchanged for use in generating session keys, the handshake further involving:

the local security entity explicitly indicating to the remote security entity the services and specific attributes required of said remote system by the local system, the remote security entity explicitly indicating to the local security entity the specific attributes that the remote system requires of the local system in respect of said services, and the exchange of attribute justifications, in the form of certificates, between the security entities, wherein the attribute justifications passed from the local security entity to the remote security entity are chosen from a set of available attributes justifications, on the basis of the explicit indication of the specific attributes that the remote system requires of the local system;

wherein said handshake as a three message handshake, comprising: a first message passing from the local security entity to said remote security entity and indicating the services and attributes required of said remote system by the local system, the second message passing from the remote security entity to the local security entity and indicating the attributes that the remote system requires of the local system in respect of said services, and the second message also including attribute justifications provided by the remote system, and a third message passing from the local security entity to said remote security entity and including attribute justifications provided by the local system.

* * * * *